M. &. J. P. GORE.
ROCK DRILLING MACHINE.
No. 16,146. Patented Dec. 2, 1856.
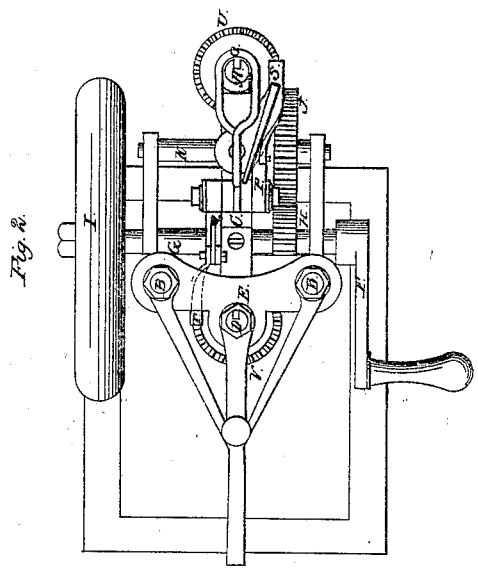
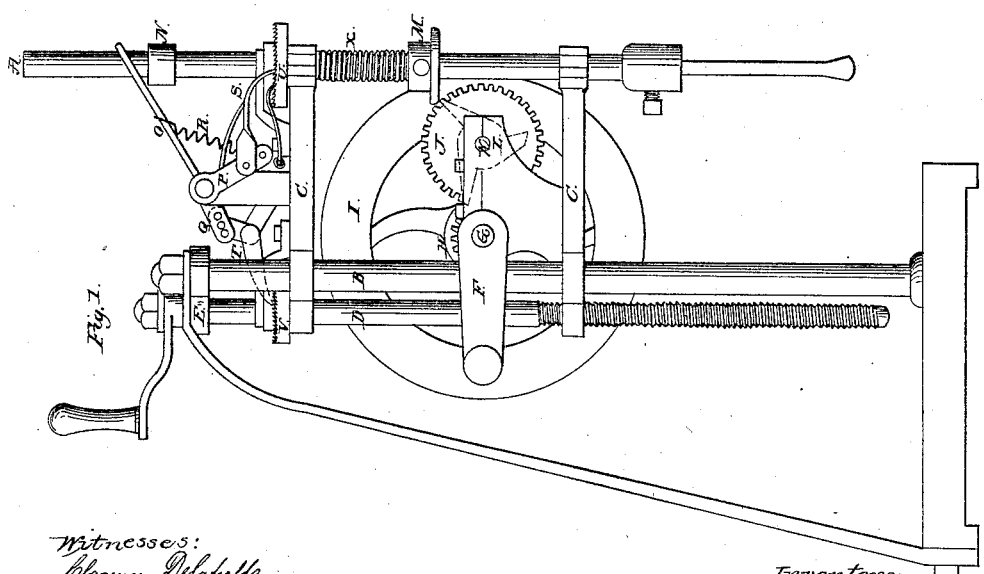

UNITED STATES PATENT OFFICE.

MARTIN GORE AND JOHN P. GORE, OF ST. LOUIS, MISSOURI.

ROCK-DRILLING MACHINE.

Specification of Letters Patent No. 16,146, dated December 2, 1856.

*To all whom it may concern:*

Be it known that we, MARTIN GORE and JOHN P. GORE, of the city of St. Louis, in the State of Missouri, have invented a new and useful Improvement on Rock-Drilling Machines; and we do hereby declare that the following is a full and exact description of the operation and construction of the same, reference being had to the annexed drawings, making a part of this specification, in which—

Figure 1 is a side elevation, and Fig. 2 a plan or top view.

A is a drill-bar.

B, B, are the columns that support the frame C, C, in which the screw D is made to work. The screw is secured at its top in the yoke E, which also secures the top of the columns B, B. The frame C C is made to slide freely upon the columns and is governed in its ascent and descent by the action of the screw D. The entire machinery, including the drill bar, is attached to this frame and rises and falls with it.

To make the operation, and construction of the machine clearly understood, let us suppose it to be put in operation: The power is applied to the crank F which is secured to the shaft G, to which the pinion H, and the fly wheel I are attached. The pinion H meshes in the spur wheel J, which is secured to the shaft K, and to which also is attached the cam L shown in dotted lines, Fig. 1. The cam L in revolving comes in contact with the collar M, and raises the drill-bar A, which brings the collar N in contact with the arm O. This arm is secured to the rock-shaft to which the levers P and Q are attached, and causes them to vibrate as it rises and falls with the drill bar,—the arm being brought down by the spring R. The levers P and Q in vibrating cause the two pawls S and T to advance and recede. These pawls catch in the two ratchet wheels U and V, and turn at the same time the drill bar and the screw D, the latter feeding the frame and drill down, just as fast as the drill cuts. The feed is regulated to suit the density of the rock, by the adjustable holes in the levers P and Q.

The blow of the drill is regulated, by sliding the collar M up or down, so as to increase the energy of the spring X, which is the impelling force of the drill-bar.

We do not claim feeding the drill at the end or during its down stroke, by the action of its head on the device holding its suspending mechanism; another operation being required for turning the drill, as such constitutes no part of our invention, but What we do claim, is—

The combination of the rock shaft and its arms O P Q, with the pawls S T, ratchets V U, and the collar N on the drill shaft, for effecting the feed and turning of the drill by the upward movement of its shaft as hereinbefore set forth.

MARTIN GORE.
JOHN P. GORE.

Witnesses:
CLARENCE DELAFIELD,
JAMES CORNWELL.